United States Patent Office 3,492,407
Patented Jan. 27, 1970

3,492,407
PEST REPELLING COMPOSITIONS AND METHODS OF USE
Bertram Anders, Cologne-Stammheim, Rudolf Hiltmann, Wuppertal-Elberfeld, Englebert Kuhle, Bergisch-Gladbach, Klaus Sasse, Cologne-Stammheim, Hartmund Wolleber, Wuppertal-Elberfeld, and Gunther Hermann, Leverkusen, Germany, assignors to Farbenfabriken Aktiengesellschaft, Leverkusen, Germany, a German corporation
No Drawing. Filed Nov. 7, 1966, Ser. No. 592,318
Claims priority, application Germany, Nov. 9, 1965, F 47,626
Int. Cl. A01n 9/20
U.S. Cl. 424—315         22 Claims

ABSTRACT OF THE DISCLOSURE

Compositions of dispersible carrier vehicles with, and methods of using, halophenyl-substituted guanidines, some of which are known and which possess strong pest-repellent, especially bird-, rodent- and leporine animal-repellent, properties.

---

The present invention relates to particular substituted guanidines, some of which are known and which surprisingly possess strong pest-repellent, especially bird-, rodent- and leoporine animal-repellent, properties, to their compositions with dispersible carrier vehicles, and to methods for their use for pest-repellent purposes.

It has previously been suggested that tetramethyl-thiuram disulphide (A) can be used for repelling rodents. This active compound has attained considerable importance in commercial practice.

It has also been suggested that anthraquinone (B) can be used for repelling birds. This active compound has also attained considerable importance in commercial practice but it has no repellent effect on rodents.

It is an object of the present invention to provide certain particular substituted guanidines which possess valuable pest-repellent, and especially bird-repellent, rodent-repellent and leoporine animal-repellent, properties; to provide active compositions of such particular substituted guanidines, some of which are known, in the form of mixtures of such compounds with dispersible solid or liquid carrier vehicles; and to provide methods of using compounds in a new way, especially for repelling pests, such as birds, rodents, leoporine animals, and the like.

Other and further objects of the present invention will become apparent from a study of the within specification and accompanying examples.

It has now been found in accordance with the present invention that the particular substituted guanidines, some of which are known, having the formula:

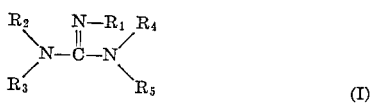

(I)

in which one of $R_1$ to $R_5$ is selected from the group consisting of halophenyl, alkyl substituted halophenyl having 1 to 4 carbon atoms in the alkyl moiety, and haloalkyl substituted halophenyl having 1 to 4 carbons in the alkyl moiety, and the remainder of said $R_1$ to $R_5$ each respectively is selected from the group consisting of hydrogen, cycloalkyl having 5 to 6 ring carbon atoms, aliphatic hydrocarbon having 1 to 12 carbon atoms, and substituted aliphatic hydrocarbon having 1 to 12 carbon atoms in the aliphatic moiety which is substituted with a member selected from the group consisting of phenyl, lower alkoxy, phenoxy, lower alkyl mercapto, phenyl mercapto, lower alkane carboxylic acid ester, carboxylic acid amide, N-substituted carboxylic acid amide, hydroxy, mercapto, cyano, carboxyl, and mixtures thereof, with the proviso that the moiety of $R_2$ and $R_3$ together with the adjacent nitrogen atom and the moiety of $R_4$ and $R_5$ together with the adjacent nitrogen atom, each respectively may form correspondingly a heterocyclic group having 5 to 6 ring members, with the additional proviso that $R_2$ may be

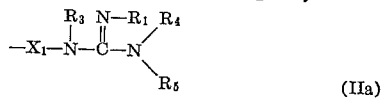

(IIa)

in which $X_1$ is lower alkylene, and $R_1$ and $R_3$ to $R_5$ are the same as defined above, and with the further proviso that $R_2$ and $R_3$ together may be

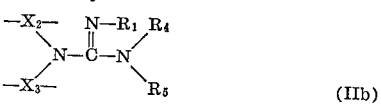

(IIb)

in which $X_2$ and $X_3$ are each lower alkylene and $R_1$, $R_4$ and $R_5$ are the same as defined above; and the corresponding salt form thereof, possess strong pest-repellent, and especially bird-, rodent- and leporine animal-repellent, properties.

In accordance with an advantageous feature of the present invention, pest-repellent, especially bird-, rodent- and leporine animal-repellent, compositions are provided which contain, as active ingredient, a compound of Formula I, as the free base or as the corresponding salt, in admixture with a solid diluent or carrier or in admixture with a liquid diluent or carrier containing a surface-active agent.

It is very surprising that the particular active compounds usable according to the present invention, alone or in the form of mixtures with dispersible carrier vehicles as noted above, have not only a substantially higher repellent action against rodents than the known rodent repellent tetramethyl-thiuram disulfide (A), but also a substantially higher repellent action against birds than the known bird repellent anthraquinone (B). The particular active compounds usable according to the present invention thus represent a valuable addition to the art.

As particular examples of active compounds usable according to the present invention, the following may be mentioned:

N-(4-chloro-phenyl)-N',N'-diethyl-guanidine
N-(2,3-dichloro-phenyl)-N',N'-dimethyl-guanidine
N-(2,4-dichloro-phenyl)-N',N'-diethyl-guanidine
N-(2,5-dichloro-phenyl)-N',N'-dimethyl-guanidine
N-(3,4-dichloro-phenyl)-N',N'-dimethyl-guanidine
N-(3,5-dichloro-phenyl)-N',N'-dimethyl-guanidine
N-(2,3,4-trichloro-phenyl)-N',N'-dimethyl-guanidine
N-(2,4,5-trichloro-phenyl)-N',N'-dimethyl-guanidine
N-(3,4-dibromo-phenyl)-N',N'-dimethyl-guanidine
N-(pentachloro-phenyl)-N',N'-dimethyl-guanidine
N-(2-chloro-4-methyl-phenyl)-N',N'-dimethyl-guanidine
N-(2-chloro-6-methyl-phenyl)-N',N'-dimethyl-guanidine
N-(2,4-dichloro-5-methyl-phenyl)-N',N'-dimethyl-guanidine
N-(2-chloro-5-trifluoromethyl-phenyl)-N',N'-dimethyl-guanidine
N-(3,4-dichloro-phenyl)-N'-methyl-guanidine
N-(3,4-dichloro-phenyl)-N'-ethyl-guanidine
N-(3,4-dichloro-phenyl)-N'-propyl-guanidine
N-(3,4-dichloro-phenyl)-N'-isopropyl-guanidine
N-(3,4-dichloro-phenyl)-N'-butyl-guanidine
N-(3,4-dichloro-phenyl)-N'-isobutyl-guanidine
N-(3,4-dichloro-phenyl)-N'-sec.-butyl-guanidine
N-(3,4-dichloro-phenyl)-N'-tert.-butyl-guanidine
N-(3,4-dichloro-phenyl)-N'-dodecyl-guanidine N-(3,4-dichloro-phenyl)-N'-allyl-guanidine
N-(3,4-dichloro-phenyl)-N'-benzyl-guanidine
N-(3,4-dichloro-phenyl)-N'-(2-hydroxy-ethyl)-guanidine
N-(3,4-dichloro-phenyl)-N'-(3-methoxy-propyl)-guanidine
N-(3,4-dichloro-phenyl)-N'-(2-phenoxy-ethyl)-guanidine
N-(3,4-dichloro-phenyl)-N'-(2-mercapto-ethyl)-guanidine
N-(3,4-dichloro-phenyl)-N'-(2-ethylmercapto-ethyl)-guanidine
N-(3,4-dichloro-phenyl)-N'-(2-phenylmercapto-ethyl)-guanidine
N-(3,4-dichloro-phenyl)-N'-(2-cyano-ethyl)-guanidine
N-(3,4-dichloro-phenyl)-N'-(carboxymethyl)-guanidine
N-(3,4-dichloro-phenyl)-N'-(carbethoxymethyl)-guanidine
N-(3,4-dichloro-phenyl)-N'-(carbamidomethyl)-guanidine
N-(3,4-dichloro-phenyl)-N'-cyclohexyl-guanidine
N-(3,4-dichloro-phenyl)-N',N'-diethyl-guanidine
N-(3,4-dichloro-phenyl)-N',N'-dipropyl-guanidine
N-(3,4-dichloro-phenyl)-N',N'-diisobutyl-guanidine
N-(3,4-dichloro-phenyl)-N',N'-diallyl-guanidine
N-(3,4-dichloro-phenyl)-N'-methyl-N'-(2-hydroxy-ethyl)-guanidine
N-(3,4-dichloro-phenyl)-N'-methyl-N'-(2-cyano-ethyl)-guanidine
N-(3,4-dichloro-phenyl)-N',N'-pentamethylene-guanidine
N-(3,4-dichloro-phenyl)-N',N'-3-oxa-pentamethylene-guanidine
N-(3,4-dichloro-phenyl)-N',N'-3-sulphapentamethylene-guanidine
N-(3,4-dichloro-phenyl)-N',N''-diethyl-guanidine
N-(3,4-dichloro-phenyl)-N',N''-dipropyl-guanidine
N-(3,4-dichloro-phenyl)-N',N',N''-triethyl-guanidine
N-(3,4-dichloro-phenyl)-N',N',N'',N''-tetramethyl-guanidine
N-(3,4-dichloro-phenyl)-N',N',N'',N''-tetraethyl-guanidine
N-(3,4-dichloro-phenyl)-N',N',N'',N''-tetrapropyl-guanidine
N-(3,4-dichloro-phenyl)-N',N',N'',N''-bis-[pentamethylene]-guanidine
N-(3,4-dichloro-phenyl)-N',N',N'',N''-bis-[3-oxa-pentamethylene]-guanidine
N-[4-(3-iodo)-n-propyl-phenyl]-N-ethoxy-N'-ethynyl-N'-(4-cyano-n-buten-1-yl)-guanidine
N-(3-bromo-5-sec.-butyl)-phenyl-N'-octen-4-yl-N''-[(12-phenylmercapto)-dodecyn-6-yl]-N''-[(12-phenoxy)-dodecyn-6-yl]-guanidine and also published German patent specification Nos. 1,170,931 and 1,125,908).

The instant guanidines can be used not only as free bases but also in the form of their salts. The anion of the acid is of no importance for the purposes of the present invention. All acids can therefore be used as corresponding salt-forming acids.

Significantly, the particular active compounds according to the instant invention have a low toxicity towards warm-blooded animals and a low phytotoxicity, but a repellent effect on noxious birds such as anserine birds (Anseriformes), gallinaceous birds (Galliformes), birds of the plover type (Charadriiformes), cuculidae (Cuculiformes), passerines (Passeriformes), and the like.

The anserine birds essentially include the geese (Anseridae), such as ducks (Anatinae), and the like. The gallinaceous birds especially include the fowls proper (Gallidae), such as the common pheasant (*Phasianus colchicus*), and the like. Among the plovers, the pigeons (Columbae) are of particular importance, such as the wood pigeon (*Columbae palumbus*) and the rock pigeon (*Columba livia*) with their domestic varieties, and the like. Among the cuculidae, the cuckoos (Cuculi) play a special role, such as, e.g., the banana eaters (Musophagidae), and as to the parrots (Psittaci), for example the parakeets (Psittacinae), and the like. The passerines essentially include the corvine birds, such as the carrion crow (*Corvus corone*) and the rook (*Corvus frugilegus*), the starlings (Sturnidae), the American Blackbirds (Icteridae), the finches (Fringillidae) such as the sparrows (*Passer spec.*), and the weaver birds (Ploceidae), such as the red-billed weaver bird (*Quelea quelea*), and the like.

The particular active compounds according to the invention also have a repellent effect on noxious leporine animals (Lagomorpha) and rodents (Rodentia), such as sciurines (Sciuroidae), gophers (Geomyoidae) and animals of the mouse type (Muroidae) which essentially include those of the dormouse type (Muscardinidae) and the mice (Muridae), and the like.

The leporine animals essentially include the Leporidae, such as the rabbit (*Oryctolagus cuniculus*); the sciurines include, for example, the European souslik (*Citellus citellius*) and the ground squirrel (*Citellus lateralis*), and the gophers include, for example, the mountain pocket gopher (*Thomomys talpoides*); and the like.

The animals of the dormouse type include, for example, the fat dormouse (*Glis glis*), and the like.

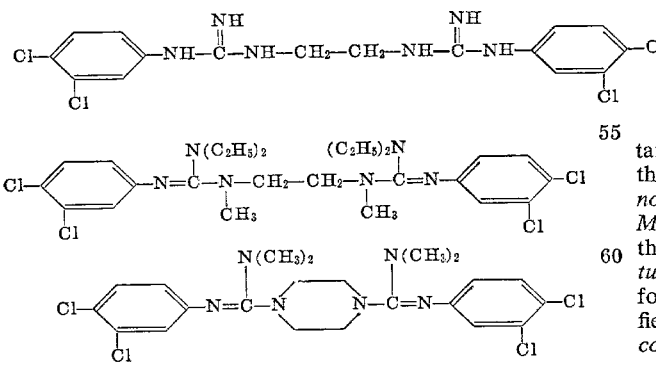

Only some of the guanidines usable according to the present invention are known from the literature. The new guanidines, however, can be prepared in a simple manner by the same methods as the known guanidines. For example, the guanidines are obtained by the addition of amines onto N-cyano-anilines; by the reaction of S-alkyl-isothio-ureas with amines; or by the reaction of isocyano dichlorides or chloroformamidines with amines (cf. e.g. Houbel-Weyl, Methoden der organischen Chemie, volume VIII, Oxygen Compounds, part 3, pages 180–188, The mice essentially comprise in the group of long-tailed mice (Murinae) the rats (*Rattus spec.*), such as the roof rat (*Rattus rattus*) and the Norway rat (*Rattus norvegicus*), and the house mice (*Mus spec.*), such as *Mus musculus*. In the group of hamster type (Cricetinae) there is included the European hamster (*Cricetus cricetus*) and, in the group of short-tailed mice (Microtinae), for example, the commone vole (*Microtus arvalis*), the field vole (*Microtus agrestis*) and the water vole (*Arvicola terrestris*), and the like.

All of the foregoing types of creatures are broadly contemplated herein in connection with the scope and import of the term "pest-repellent."

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powder, dusting agents, granulates, ointments, oils, lacquers, sprays, etc. These are prepared in known manner, for instance by extending the active agents with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons for instance, methylene chloride, etc.), alcohols (for instance, methanol, ethanol, (propanol, butanol, etc.), animal and vegetable oil fats for instance, lanolin, olive oil, nut oils, etc.), amines (for instance, ethanolamine, etc.), amides (for instance, dimethyl formamide, etc.), sulfoxides (for instance, dimethyl sulfoxide, etc.), ketones (for instance, acetone, etc.), and water; as well as dispersible finely divided solid carriers, such as ground natural minerals (for instance, kaolins, alumina, silica, chalk, i.e., calcium carbonate, talc, kieselguhr, etc.) and ground synthetic minerals (for instance, highly dispersed silicic acid, silicates, e.g., alkyl silicates, etc.); whereas the following may be chiefly considered for use as carrier vehicle assistants, e.g., surface-active agents, for this purpose: emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

The substances according to the invention may be employed by themselves as the artisan will appreciate, in the form of their compositions with solid or liquid dispersible carrier vehicles or other known compatible active agents such as insecticides, fungicides, herbicides, nematocides, etc., or in the form of particular dosage preparations for specific application made therefrom, such as solutions, emulsions, suspensions, powders, pastes, ointments, oils, lacquers, sprays, and granulates which are thus ready for use.

As concerns commercially marketed preparations, these generally contemplate carrier composition mixtures in which the active compound is present in an amount substantially between about 0.001–95% by weight, and preferably 0.005–90% by weight of the mixture, whereas carrier composition mixtures suitable for direct application or field application generally contemplate those in which the active compound is present in an amount substantially between about 0.1 and 20%, preferably 0.5 and 10%, by weight of the mixture. Thus, the present invention contemplates over-all compositions which comprise mixtures of a dispersible carrier vehicle, such as (1) a dispersible carrier solid, or (2) a dispersible carrier liquid including a carrier vehicle assistant, e.g., surface-active agent, such as an emulsifying agent and/or a dispersing agent, and an amount of the active compound which is effective for the purpose in question and which is generally between about 0.001 and 95% by weight of the mixture.

Furthermore, the present invention contemplates methods of repelling pests, especially birds, rodents, and leporine animals, which comprises applying to at least one of (a) the corresponding pest habitat and (b) materials from which such pests are to be repelled, a pest-repellent, especially bird-repellent and/or rodent-repellent, and/or leporine animal-repellent, effective amount of the particular active compound of the invention alone or together with a carrier vehicle, as noted above. The instant formulations or compositions are applied in the usual manner, for example, by spraying, atomizing, vaporizing, scattering, dusting, watering, sprinkling, pouring, rubbing, and the like.

It will be realized in accordance with the present invention that the instant compounds may be used effectively not only in plant protection but also against birds, rodents, and leporine animals, specifically for protection per se against such pests. When applied as seed dressing, the instant compounds are used in an amount of between about 0.01 and 5.0, preferably 0.025 and 1, part by weight per 100 parts (e.g., grams) of seed. When applied to plants or plant parts in danger of being eaten by birds or rodents, such compounds are used in an amount between about 0.1 and 20, preferably 0.5 and 10% by weight of the preparation used, e.g., as a spray liquor. When applied by soil treatment, or by fumigation in rooms or subterranean habitats, or by ways of repellent coatings and barriers aboveground and underground, or by impregnation of materials susceptible to attach by birds and/or rodents, such as wood, paper, rubber, synthetic materials, etc., the instant compounds are used in an impregnating concentration between about 0.1 and 80% by weight of the preparation used, e.g., spray liquor, to provide a concentration of the active compound in the appropriate surface layer of 0.1–5% by weight.

The following example is given by way of illustration, and not limitation, of the utility of the particular compounds usable according to the present invention.

EXAMPLE 1

A. Repellent test/domestic pigeon

Test animal: domestic pigeon (*Columba livia*).

To produce a suitable preparation of the particular active compound, 3 parts by weight of such active compound are mixed with 2.8 parts by weight of highly dispersed silicic acid and 4.2 parts by weight of talc. Six parts by weight of this concentrate of active compound as seed dressing are intimately mixed with 1000 parts by weight of wheat seeds and, after the addition of 11 parts by weight of polyethylene glycol as adhesive, the mixture is shaken until the seed material is uniformly impregnated with the seed dressing. The content of active compound in the dressed seed thus amounts to 0.18% by weight.

120 grams of the wheat thus impregnated are placed in a transparent plastic container provided with a circular opening in its front wall. This container is offered to 2 wild domestic pigeons which are kept together. No untreated food is available to the pigeons, but water is liberally supplied. The test is carried out in permanent light for 60 hours.

The weighed residual amount of so-treated seeds as a percentage of the amount used for the test is taken as a measure of the repellent effect: 100% thus means that no wheat has been eaten and the repellent effect was complete.

The active compounds, the repellent effect and the number of individual tests can be seen from Columns I, II and III of the following Table 1.

B. Repellent test/house mouse

Test animal: white laboratory mouse (*Mus musculus*). Concentration of active compound in the test food: 0.5%.

To produce a suitable preparation of the particular active compound, 3 parts by weight of such active compound are mixed with 2.8 parts by weight of highly dispersed silicic acid and 4.2 parts by weight of talc. To prepare the test bait, 1.67 parts by weight of this concentrate of the active compound are intimately mixed with 95 parts by weight of a flour-like standard food as is normally used for test animals, with the addition of 3.33 parts by weight of methyl cellulose and some water. From 6 g. of dry substance so produced there are shaped two spherical bait pellets which are dried at room temperature for 24 hours before the test starts.

The pellets are offered for 24 hours, without additional food, to 2 white laboratory mice which are kept together. Water is supplied liberally. The remaining material of the pellets is dried again and weighed when the test is terminated.

The weighed residual amount, expressed as a percentage of the amount originally used for the test, is taken as a measure of the repellent effect. A 100% repellent effect means that nothing of the pellets has been eaten at all.

The active compounds, the number of individual tests and the repellent effect results obtained can be seen from Columns I, IV and V of the following Table 1.

TABLE I

| | Active compound I | (A) Repellent test/domestic pigeon | | (B) Repellent test/house mouse | |
|---|---|---|---|---|---|
| | | Number of individual tests II | Repellent effect as percent (mean value) III | Number of individual tests IV | Repellent effect as percent (mean value) V |
| (A) | Tetramethyl thiuram disulphide (known) | 2 | 57.1 | 3 | 67.0 |
| (B) | Anthraquinone (known) | 2 | 30 | 4 | 0 |
| (III) | Cl-C$_6$H$_3$(Cl)-NH-C(=NH)-N(C$_2$H$_5$)$_2$ · CH$_3$SO$_3$H  M.P. 176–177° C. | 5 | 93.1 | 3 | 92.8 |
| (IV) | Cl-C$_6$H$_3$(Cl)-NH-C(=NH)-NH-C$_6$H$_{11}$  M.P. 146–147° C. | 4 | 92.0 | 3 | 88.9 |
| (V) | Cl-C$_6$H$_3$(Cl)-NH-C(=NH)-N(C$_2$H$_5$)$_2$ (Cl in other position)  M.P. 82–84° C. | 4 | 83.3 | 3 | 95.0 |
| (VI) | Cl$_3$-C$_6$H$_2$-NH-C(=NH)-N(C$_2$H$_5$)$_2$  M.P. 132–135° C. | 3 | 92.7 | 3 | 96.6 |
| (VII) | Cl-C$_6$H$_3$(Cl)-NH-C(=NH)-N(C$_2$H$_5$)$_2$  M.P. 93–95.5° C. | 4 | 92.9 | 3 | 92.2 |
| (VIII) | Cl-C$_6$H$_3$(Cl)-NH-C(=NH)-N(C$_3$H$_7$)$_2$  Oil. | 4 | 59.2 | 3 | 96.6 |
| (IX) | Cl-C$_6$H$_3$(Cl)-NH-C(=NH)-N(C$_4$H$_9$)$_2$  Oil. | 1 | 80.8 | 2 | 81.7 |
| (X) | Cl-C$_6$H$_3$(Cl)-NH-C(=NH)-NH-C$_2$H$_5$  Oil. | 4 | 94.1 | 3 | 99.4 |
| (XI) | Cl-C$_6$H$_3$(Cl)-NH-C(=NH)-NH-C$_3$H$_7$  M.P. 66–68° C. | 1 | 71.6 | 2 | 75 |
| (XII) | Cl-C$_6$H$_3$(Cl)-NH-C(=NH)-NH-CH(CH$_3$)$_2$  Oil. | 2 | 94.5 | 3 | 95.6 |

TABLE I—Continued

| Active compound I | (A) Repellent test/domestic pigeon | | (B) Repellent test/house mouse | |
|---|---|---|---|---|
| | Number of individual tests II | Repellent effect as percent (mean value) III | Number of individual tests IV | Repellent effect as percent (mean value) V |
| (XIII) Cl-C6H3(Cl)-NH-C(=NH)-N(CH3)2  Oil. | 2 | 93.2 | 3 | 87.8 |
| (XIV) Cl-C6H3(Cl)-NH-C(=NH)-N(C2H5)2  Oil. | 4 | 93.9 | 3 | 81.7 |
| (XV) Cl5-C6-N=C(NH-C2H5)-NH-C2H5  Oil. | 1 | 80.0 | 3 | 92.8 |
| (XVI) Cl3-C6H2-N=C(N(CH3)2)-N(CH3)2  Oil. | 3 | 86.1 | 3 | 92.2 |
| (XVII) Cl-C6H3(Cl)-N=C(N(CH3)2)-NH-CH2-CH=CH2  Oil. | 2 | 88.3 | 3 | 88.8 |
| (XVIII) Cl-C6H3(Cl)-N=C(N(CH3)2)-NH-CH3  Oil. | 4 | 91.8 | 2 | 69.1 |
| (XIX) Cl-C6H3(Cl)-N=C(NH-CH3)-NH-CH3  M.P. 126–129° C. | 3 | 92.1 | 3 | 88.9 |
| (XX) Cl5-C6-N=C(NH-CH3)-NH-CH3  M.P. 217–219° C. | 1 | 80.0 | 3 | 88.9 |
| (XXI) Cl-C6H3(Cl)-N=C(NH-C3H7n)-NH-C3H7n  Oil. | 2 | 89.1 | 4 | 84.6 |
| (XXII) Cl-C6H3(Cl)-N=C(NH-C3H7i)-NH-C3H7i  Oil. | 2 | 94.9 | 2 | 91.7 |
| (XXIII) Cl-C6H3(Cl)-N=C(NH-C2H5)-NH-C2H5  Oil. | 2 | 95.8 | 4 | 78.4 |
| (XXIV) Cl-C6H3(Cl)-NH-C(=NH)-N(morpholino)  M.P. 80–85° C. | 4 | 87.3 | 3 | 75.0 |

TABLE I—Continued

| | | (A) Repellent test/domestic pigeon | | (B) Repellent test/house mouse | |
|---|---|---|---|---|---|
| Active compound | I | Number of individual tests | Repellent effect as percent (mean value) | Number of individual tests | Repellent effect as percent (mean value) |
| | | II | III | IV | V |
| (XXV) Cl—⟨Cl⟩—NH—C(=NH)—NH—CH₂—⟨⟩ M.P. 109–110° C. | | 4 | 89.8 | 4 | 87.9 |
| (XXVI) Cl—⟨Cl⟩—NH—C(=NH)—NH—CH₂—CH₂—OH Oil. | | 1 | 85.8 | 1 | 67.0 |
| (XXVII) Cl—⟨Cl⟩—NH—C(=NH)—NH—C₁₂H₂₅ Oil. | | 3 | 80.5 | 3 | 82.8 |
| (XXVIII) Cl—⟨Cl⟩—N=C(NH—C₄H₉)—NH—C₄H₉ Oil. | | 2 | 92.0 | 2 | 77.5 |
| (XXIX) Cl—⟨Cl⟩—N=C(NH—CH₂—CH=CH₂)—NH—CH₂—CH=CH₂ Oil. | | 2 | 84.6 | 3 | 85.0 |

Advantageously, in accordance with the present invention, in the foregoing formula:

No more and no less than one of the radicals $R_1$ to $R_5$ is a substituted phenyl radical, the remainder of said $R_1$ to $R_5$ radicals each being other than phenyl in constitution, whereby:

(i) One of $R_1$ to $R_5$ is halo-phenyl, such as chloro, bromo, fluoro and/or iodo substituted phenyl, including mono, di, tri, tetra and penta as well as mixed di to penta chloro, bromo, fluoro and iodo substituted phenyl, and especially chloro and/or bromo substituted phenyl, and the like; or alkyl substituted halo-phenyl having 1-4 carbon atoms in the alkyl moiety, such as chloro, bromo, fluoro and/or iodo substituted phenyl of the aforementioned type which is further substituted with methyl, ethyl, n-propyl, iso-propyl, n-butyl, iso-butyl, sec.-butyl and/or tert.-butyl, especially mono, di, tri, tetra and/or mixed chloro, bromo, fluoro and iodo, most especially chloro and/or bromo, substituted phenyl which is correspondingly also substituted with mono, di, tri, tetra and/or mixed methyl to tert.-butyl (i.e. $C_1$–$C_4$ alkyl inclusive) in one or more of those positions at which no such halo substituent is present, and the like; or halo-alkyl substituted halo-phenyl having 1-4 carbon atoms in the alkyl moiety, such as chloro, bromo, fluoro and/or iodo substituted phenyl of the aforementioned type which is further substituted with chloro, fluoro, bromo and/or iodo, especially chloro and/or bromo, -alkyl having 1-4 carbon atoms, such as methyl to tert.-butyl as enumerated specifically hereinabove, and particularly mono, di, tri, tetra and mixed chloro, bromo, fluoro and iodo substituted phenyl which is correspondingly also mono, di, tri, tetra and/or mixed halo-alkyl substituted in one or more of those positions at which no such halo substituent is present, and the like; and (ii) The remainder of the radicals $R_1$ to $R_5$ each respectively is:

Hydrogen; or

Cycloalkyl having 5-6 ring carbon atoms, such as cyclopentyl, cyclohexyl, and the like; or Aliphatic hydrocarbon having 1-12 carbon atoms such as methyl, ethyl, n-propyl, iso-propyl, n-butyl, iso-butyl, sec.-butyl, tert.-butyl, n-amyl, iso-amyl, tert.-amyl, n-hexyl, iso-hexyl, heptyl, octyl, nonyl, decyl, undecyl, dodecyl, etc., vinyl, α-, β- and γ-allyl, butenyl, pentenyl, hexenyl, heptenyl, octenyl, nonenyl, decenyl, undecenyl, dodecenyl etc., ethynyl, propynyl, butynyl, pentynyl, hexynyl, heptynyl, octynyl, nonynyl, decynyl, undecynyl, dodecynyl, especially $C_{1-12}$ alkyl, $C_{2-12}$ alkenyl, and $C_{2-12}$ alkynyl, and most especially lower alkyl, e.g. having 1-4 carbon atoms, lower alkenyl, e.g. having 2-4 carbon atoms, lower alkynyl, e.g. having 2-4 carbon atoms, and the like; or Such aliphatic hydrocarbon having 1-12 carbon atoms in the aliphatic moiety of the types specifically enumerated hereinabove which is substituted with phenyl, or lower alkoxy, such as methoxy, ethoxy, n-propoxy, iso-propoxy, n-butoxy, iso-butoxy, sec.-butoxy, tert.-butoxy, especially $C_{1-4}$ alkoxy, and the like, etc., or phenoxy, or lower alkyl-mercapto, such as methyl-mercapto, ethyl-mercapto, n - propyl - mercapto, iso - propyl - mercapto, n-butyl-mercapto, iso-butyl-mercapto, sec.-butyl-mercapto, tert.-butyl-mercapto, especially $C_{1-4}$ alkyl-mercapto, and the like, etc., or phenylmercapto, or lower alkane carboxylic acid ester, such as carbo-methoxy, carbo-ethoxy, carbo-propoxy, carbo-butoxy, etc., especially carbo-lower alkoxy, i.e.

etc., or carboxylic acid amide, i.e. the carbamido group $NH_2$—CO, or N-substituted carboxylic acid amide, i.e. N-lower alkyl-, N-aralkyl-, N-aryl carboxylic acid amide, or hydroxy, or mercapto, i.e. the mercapto group H—S—, or cyano, or carboxyl, or mixtures of the foregoing phenyl, lower alkoxy, phenoxy, lower alkyl-mercapto, phenylmercapto, lower alkane carboxylic acid ester, carboxylic acid amide, hydroxy, mercapto, cyano and carboxyl groups;

With the proviso that the moiety of $R_2$ and $R_3$ together with the adjacent nitrogen atom and/or the moiety of $R_4$ and $R_5$ together with the adjacent nitrogen atom, each such moiety respectively, may form correspondingly a heterocyclic group having 5–6 ring members, such as piperidyl, pyrrolidyl, morpholyl, thiomorpholyl, etc., such heterocyclic groups optionally containing oxygen or sulfur linkages to form oxa- or sulfa-tetramethylene or pentamethylene groups, most especially 3-oxapentamethylene and 3-sulfapentamethylene, and the like;

With the additional proviso that $R_2$ may be

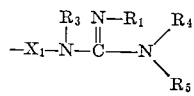

in which $X_1$ is lower alkylene which may optionally include an oxygen or nitrogen or sulfur linkage, such as 3-oxatetramethylene, 2 - azo - trimethylene, 2-sulfa-tetramethylene, etc., especially oxa, aza or sulfa di-, tri- or tetra-methylene, i.e. $C_{1-4}$ alkylene optionally interrupted by the linkage —O—, —N— or —S—, with the corresponding $R_1$ and $R_3$ to $R_5$ radicals being the same as defined above;

With the further proviso that $R_2$ and $R_3$ together may be

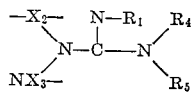

in which $X_2$ and $X_3$ are each respectively lower alkylene, such as methylene, dimethylene, trimethylene, etc., especially $C_{1-3}$ alkylene, with the corresponding $R_1$, $R_4$ and $R_5$ being the same as defined above;

With the substituted phenyl guanidine compound of the foregoing type being in the form of the free base or the corresponding salt thereof, i.e. the corresponding quaternary ammonium salt with an acid, such as the corresponding salts of inorganic or mineral acids including hydrochloric, sulfuric, phosphoric, nitric, perchloric, ferrohydrocyanic, etc., mineral acids, and the like, as well as organic acids including alkanoic, especially lower alkanoic, alkane dioic, especially lower alkane dioic, and alkane trioic, especially lower alkane trioic, alkanoic acids, especially mono, di and tri basic alkanonic acids containing mono to tri hydroxy groups, most especially such alkane carboxylic acids of the stated type having 2–8 carbon atoms, such as acetic, tartaric, citric, etc., or benzene carboxylic acids including hydroxy substituted benzene carboxylic acids, such as benzoic acid, salicylic acid, etc., or phenolic acids, especially mono, di and tri nitro-substituted phenolic acids, such as picric acid, etc., or alkane sulfonic acids, especially $C_{1-4}$ lower alkane sulfonic acids, including methane sulfonic acid, etc., or alkyl sulfuric acids, especially $C_{1-4}$ lower alkyl sulfuric acids, including methyl sulfuric acid, etc., or aryl sulfonic acids, especially $C_{6-10}$ mono and di nuclear carbocyclic aryl sulfonic acids, i.e., having 6–10 ring carbon atoms, including benzene sulfonic acid, etc., and the like.

Generally, in the case of a bis compound containing an interlinking $X_1$ or $X_2$ and $X_3$ moiety, but one corresponding $R_{1-5}$ radical in each of the two bis moieties will be a halophenyl radical of the type noted hereinabove.

In particular, in accordance with the present invention, in the foregoing formulae, one of $R_1$ to $R_5$ is halophenyl and the remainder of such $R_1$ to $R_5$ are cycloalkyl having 5–6 ring carbon atoms, aliphatic having 1–12 carbon atoms, and substituted aliphatic having 1–12 carbon atoms in the aliphatic moiety, which is substituted with phenyl and/or hydroxy, with the proviso that $R_2$ and $R_3$ taken together and/or $R_4$ and $R_5$ taken together each respectively may form correspondingly an oxapenta-methylene attached to the particular adjacent nitrogen atom.

In accordance with preferred features and embodiments of the invention:

(a) $R_1$ and $R_2$ are hydrogen, $R_3$ is chlorophenyl having 2–5 chloro substituents, and $R_4$ and $R_5$ are lower alkyl;

(b) $R_1$, $R_2$ and $R_4$ are hydrogen, $R_3$ is chlorophenyl having 2–5 chloro substituents, and $R_5$ is alkyl having 1–12 carbon atoms;

(c) $R_1$ is chlorophenyl having 2–5 chloro substituents, $R_2$ and $R_4$ are hydrogen, and $R_3$ and $R_5$ are lower alkyl or lower alkenyl;

(d) $R_1$ is chlorophenyl having 2–5 chloro substituents, $R_2$ and $R_3$ are lower alkyl, $R_4$ is hydrogen or lower alkyl, and $R_5$ is lower alkyl or lower alkenyl, $R_4$ preferably being hydrogen when $R_5$ is lower alkenyl;

(e) $R_1$, $R_2$ and $R_4$ are hydrogen, $R_3$ is chlorophenyl having 2–5 chloro substituents, and $R_5$ is cycloalkyl having 5–6 ring carbon atoms or phenyl-lower alkyl or hydroxy-lower alkyl; and (f) $R_1$ and $R_2$ are hydrogen, $R_3$ is chlorophenyl having 2–5 chloro substituents, and $R_4$ and $R_5$ taken together form a polymethylene having 4–5 chain members or oxapolymethylene having 4–5 chain members or sulfapolymethylene having 4–5 chain members or azopolymethylene having 4–5 chain members.

It will be realized by the artisan that all of the foregoing compounds contemplated by the present invention possess the desired pest-repellent, especially bird-, rodent- and leporine animal-repellent activity, and extremely low phytotoxicity as regards cultivated plants, as well as extremely low toxicity towards warm-blooded animals.

It will be appreciated that the instant specification and examples are set forth by way of illustration and not limitation, and that various modifications and changes may be made without departing from the spirit and scope of the present invention.

What is claimed is:

1. Pest-repellent composition which consists essentially of a mixture of a dispersible carrier vehicle selected from the group consisting of (1) a dispersible liquid diluent containing a surface active agent, and (2) a dispersible finely divided solid, and a pest-repellent effective amount, substantially between about 0.001 and 95% by weight of the mixture, of a substituted guanidine compound selected from the group consisting of substituted guanidine of the formula

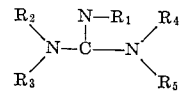

in which one of $R_1$ to $R_5$ is selected from the group consisting of chlorophenyl, bromophenyl, alkyl substituted chlorophenyl of 1 to 4 carbon atoms in the alkyl moiety, and fluoroalkyl substituted chlorophenyl of 1 to 4 carbon atoms in the alkyl moiety, and the remainder of said $R_1$ to $R_5$ each respectively is selected from the group consisting of hydrogen, cycloalkyl of 5 to 6 ring carbon atoms, aliphatic hydrocarbon of 1 to 12 carbon atoms, and substituted alkyl hydrocarbon of 1 to 12 carbon atoms in the alkyl moiety which is substituted with a member selected from the group consisting of phenyl, alkoxy of 1 to 4 carbon atoms, phenoxy, alkyl mercapto of 1 to 4 carbon atoms, phenyl mercapto, alkane carboxylic acid ester of 1 to 4 carbon atoms in the alkane moiety, carboxylic acid amide, hydroxy, mercapto, cyano, and carboxyl, with the proviso that the moiety of $R_2$ and $R_3$ together and the moiety of $R_4$ and $R_5$ together, each respectively, may form correspondingly a member selected from the group consisting of polymethylene of 4 to 5 chain members, oxa-polymethylene of 4 to 5 chain members, and sulfapolymethylene of 4 to 5 chain members, attached to the adjacent nitrogen atom, with the additional proviso that $R_2$ may be

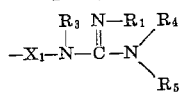

in which $X_1$ is alkylene of 1 to 4 carbon atoms, and $R_1$ and $R_3$ to $R_5$ are the same as defined above, and with the further proviso that $R_2$ and $R_3$ together may be

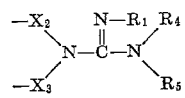

in which $X_2$ and $X_3$ are each respectively alkylene of 1 to 3 carbon atoms and $R_1$, $R_4$ and $R_5$ are the same as defined above; and the corresponding methyl sulfate salt thereof.

2. Composition according to claim 1 wherein one of $R_1$ to $R_5$ is chlorophenyl, and the remainder of said $R_1$ to $R_5$ are selected from the group consisting of hydrogen, cycloalkyl of 5 to 6 ring carbon atoms, alkyl of 1 to 12 carbon atoms, alkenyl of 2 to 4 carbon atoms, hydroxyalkyl of 1 to 4 carbon atoms, phenyl-alkyl of 1 to 4 carbon atoms in the alkyl moiety, with the proviso that $R_4$ and $R_5$ taken together may form correspondingly an oxa-pentamethylene attached to the particular adjacent nitrogen atom.

3. Composition according to claim 1 wherein $R_1$ and $R_2$ are hydrogen, $R_3$ is chlorophenyl of 2 to 5 chloro substituents, and $R_4$ and $R_5$ are alkyl of 1 to 4 carbon atoms.

4. Composition according to claim 1 wherein $R_1$, $R_2$ and $R_4$ are hydrogen, $R_3$ is chlorophenyl of 2 to 5 chloro substituents, and $R_5$ is alkyl of 1 to 12 carbon atoms.

5. Composition according to claim 1 wherein $R_1$ is chlorophenyl of 2 to 5 chloro substituents, $R_2$ and $R_4$ are hydrogen and $R_3$ and $R_5$ are selected from the group consisting of alkyl of 1 to 4 carbon atoms and alkenyl of 2 to 4 carbon atoms.

6. Composition according to claim 1 wherein $R_1$ is chlorophenyl of 2 to 5 chloro substituents, $R_2$ and $R_3$ are alkyl of 1 to 4 carbon atoms, $R_4$ is selected from the group consisting of hydrogen and alkyl of 1 to 4 carbon atoms, and $R_5$ is selected from the group consisting of alkyl of 1 to 4 carbon atoms and alkenyl of 2 to 4 carbon atoms.

7. Composition according to claim 1 wherein $R_1$, $R_2$ and $R_4$ are hydrogen, $R_3$ is chlorophenyl of 2 to 5 chloro substituents, and $R_5$ is selected from the group consisting of cycloalkyl of 5 to 6 ring carbon atoms, phenyl-alkyl of 1 to 4 carbon atoms in the alkyl moiety and hydroxy-alkyl of 1 to 4 carbon atoms.

8. Composition according to claim 1 wherein $R_1$ and $R_2$ are hydrogen, $R_3$ is chlorophenyl of 2 to 5 chloro substituents, and $R_4$ and $R_5$ taken together form a member selected from the group consisting of pentamethylene, oxa-pentamethylene and sulfa-pentamethylene attached to the adjacent nitrogen atom.

9. Composition according to claim 1 wherein such compound is N-(3,4-dichloro-phenyl) - N',N' - diethyl-guanidine-methyl sulfonate salt of the formula

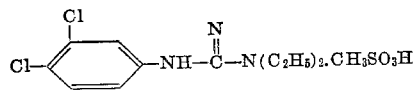

10. Composition according to claim 1 wherein such compound is N-(3,4-dichloro-phenyl)-N'-ethyl-guanidine of the formula

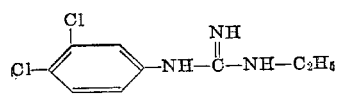

11. Composition according to claim 1 wherein such composition is in the form of a dressing on seeds, such compound being present in a repellent effective amount and in a quantity substantially between about 0.01 and 5.0 grams/100 g. of seed.

12. Method of repelling bird, rodent and leporine pests which comprises applying to at least one of (a) the corresponding pest habitat and (b) materials from which such pests are to be repelled, a repellent effective amount of the composition of claim 1.

13. Method of claim 12 wherein the substituted guanidine compound constitutes substantially between about 0.001 and 20% by weight of the composition.

14. Method of claim 12 wherein $R_1$ and $R_2$ are hydrogen, $R_3$ is chlorphenyl of 2 to 5 chloro substituents, and $R_4$ and $R_5$ are alkyl of 1 to 4 carbon atoms.

15. Method of claim 12 wherein $R_1$, $R_2$ and $R_4$ are hydrogen, $R_3$ is chlorophenyl of 2 to 5 chloro substituents, and $R_5$ is alkyl of 1 to 12 carbon atoms.

16. Method of claim 12 wherein $R_1$ is chlorophenyl of 2 to 5 chloro substituents, $R_2$ and $R_4$ are hydrogen and $R_3$ and $R_5$ are selected from the group consisting of alkyl of 1 to 4 carbon atoms and alkenyl of 2 to 4 carbon atoms.

17. Method of claim 12 wherein $R_1$ is chlorophenyl of 2 to 5 chloro substituents, $R_2$ and $R_3$ are alkyl of 1 to 4 carbon atoms, $R_4$ is selected from the group consisting of hydrogen and alkyl of 1 to 4 carbon atoms, and $R_5$ is selected from the group consisting of alkyl of 1 to 4 carbon atoms and alkenyl of 2 to 4 carbon atoms.

18. Method of claim 12 wherein $R_1$, $R_2$ and $R_4$ are hydrogen, $R_3$ is chlorophenyl of 2 to 5 chloro substituents, and $R_5$ is selected from the group consisting of cycloalkyl of 5 to 6 ring carbon atoms, phenyl-alkyl of 1 to 4 carbon atoms in the alkyl moiety and hydroxy-alkyl of 2 to 4 carbon atoms.

19. Method of claim 12 wherein $R_1$ and $R_2$ are hydrogen, $R_3$ is chlorophenyl of 2 to 5 chloro substituents, and $R_4$ and $R_5$ taken together form a member selected from the group consisting of pentamethylene, oxa-pentamethylene and sulfa-pentamethylene attached to the adjacent nitrogen atom.

20. Method of claim 12 wherein the substituted guanidine compound is N - (3,4 - dichloro-phenyl)-N',N'-diethyl-guanidine-methyl sulfonate salt.

21. Method of claim 12 wherein the substituted guanidine compound is N - (3,4 - dichloro-phenyl)-N'-ethyl-guanidine.

22. Method of claim 12 wherein the substituted guanidine compound is applied to material from which such pests are to be repelled.

References Cited

UNITED STATES PATENTS 1,915,922 6/1933 Christmann et al. ____ 260—565
2,910,497 10/1959 Meuly _____ 260—455

FOREIGN PATENTS 624,578 6/1949 England.

OTHER REFERENCES

Chemical Abstracts: vol. 33 (1939), pp. 538, vol. 36, pp. 3492 (1942), vol. 41, pp. 135 (1947), vol. 43, pp. 9039 (1949), and vol. 48 (1954), pp. 2629.

FRANK CACCIAPAGLIA, JR., Primary Examiner

F. E. WADDELL, Assistant Examiner

U.S. Cl. X.R.

424—244, 246, 248, 250, 267, 272, 273, 274, 286, 304, 311, 317, 319, 320, 326

PO-1050
(5/69)

UNITED STATES PATENT OFFICE
CERTIFICATE OF CORRECTION

Patent No. 3,492,407          Dated January 27, 1970

Inventor(s) BERTRAM ANDERS, RUDOLF HILTMANN, ENGLEBERT KUHLE, KLAUS SASSE, HARTMUND WOLLEBER, and GUNTHER HERMANN It is certified that error appears in the above-identified patent and that said Letters Patent are hereby corrected as shown below:

Column 8, Table 1 (specification, page 16) under the heading "III" third vertical figure, "93.1" should be --93.8--; column 8, Table 1 (specification, page 17) under the heading "III", eighth vertical figure, "59.2" should be --95.2--; column 15, lines 63-65, the structural formula should read as follows:

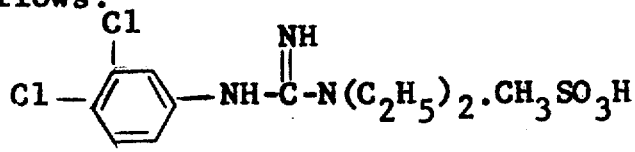

SIGNED AND
SEALED
JUN 3 0 1970

(SEAL)
Attest:

Edward M. Fletcher, Jr.
Attesting Officer

WILLIAM E. SCHUYLER, JR.
Commissioner of Patents